United States Patent
Chen

(10) Patent No.: US 7,167,355 B2
(45) Date of Patent: Jan. 23, 2007

(54) THIN-COAT METAL OXIDE ELECTRODE FOR AN ELECTROCHEMICAL CAPACITOR

(75) Inventor: Zheng Chen, Dublin, OH (US)

(73) Assignee: T.B. Kim Technologies, Inc., Los Angeles, CA (US)

( * ) Notice: Subject to any disclaimer, the term of this patent is extended or adjusted under 35 U.S.C. 154(b) by 0 days.

(21) Appl. No.: 10/050,672

(22) Filed: Jan. 16, 2002

(65) Prior Publication Data

US 2003/0133253 A1 Jul. 17, 2003

(51) Int. Cl.
*H01G 9/04* (2006.01)

(52) U.S. Cl. .................. 361/508; 361/303; 361/516

(58) Field of Classification Search ............. 361/306.3, 361/508, 511, 516, 528, 530, 532, 303
See application file for complete search history.

(56) References Cited

U.S. PATENT DOCUMENTS 6,327,135 B1 * 12/2001 Azuma et al. ............ 257/300

* cited by examiner

*Primary Examiner*—Anthony Dinkins
(74) *Attorney, Agent, or Firm*—John L. Isaac

(57) ABSTRACT

An electrode for a capacitor is provided and includes a conductive metal foil layer and an electronically conductive intermediate layer disposed on the metal foil layer. A thin metal oxide ink coating is operatively printed on the intermediate layer and in one form includes a mixture of a carbon containing powder, a metal oxide powder, a conductive binder, a polar solvent and a dispersing agent.

19 Claims, 1 Drawing Sheet

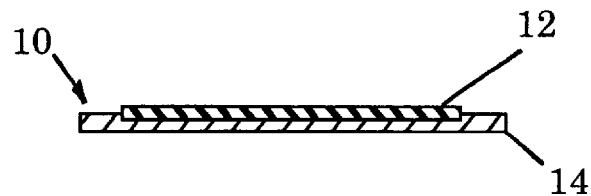
FIG. 1
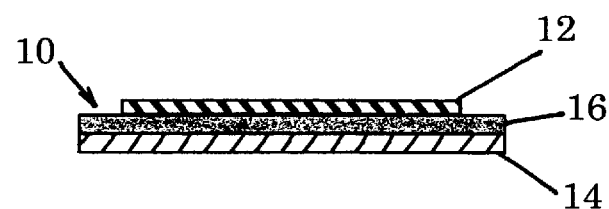
FIG. 2
FIG. 3
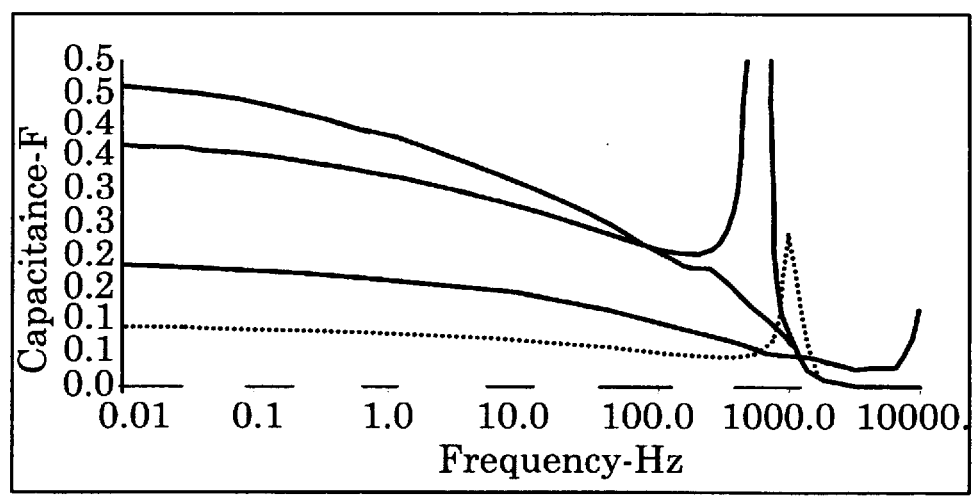

THIN-COAT METAL OXIDE ELECTRODE FOR AN ELECTROCHEMICAL CAPACITOR

RELATED APPLICATIONS

This application relates to my U.S. patent application Ser. No. 10/014,876, filed Dec. 11, 2001, and entitled "Electrochemical Capacitor Having Low Internal Resistance", as well as my U.S. patent application Ser. No. 10/050,671, filed Jan. 16, 2002, and entitled "Light-Weight Reinforced Electrochemical Capacitor and Process for Making the Same", the contents of which are specifically incorporated herein by reference.

BACKGROUND OF THE INVENTION

1. Field of the Invention

The present invention relates generally to rechargeable electrochemical capacitors and, more particularly, to electrodes for electrochemical capacitors having low internal resistance and high charge/discharge rates. Specifically, the present invention relates to improved capacitor electrodes having intermediate conductive layers and improved metal oxide inks.

2. Description of the Prior Art

Electrochemical capacitors are devices which store electrical energy at the interface between an ionically conducting electrolyte phase and an electronically conducting electrode material. Electrochemical capacitors are a class of high rate energy storage devices which use such electrolytes and electrodes of various kinds in a system similar to that of conventional batteries. The electrochemical capacitors, like batteries, are essentially energy storage devices. However, unlike batteries, capacitors rely on charge accumulation at the electrolyte/electrode interface to store energy. Charge storage in electrochemical capacitors therefore is a surface phenomenon. Conversely, charge storage in batteries is a bulk phenomena occurring within the bulk of the electrode material.

Electrochemical capacitors can generally be divided into one of two subcategories. Double layer capacitors involved those in which the interfacial capacitance at the electrode/electrolyte interface can be modeled as two parallel sheets of charge. Pseudocapacitor devices, on the other hand, are those in which charge transfer between the electrolyte and the electrode occurs over a wide potential range and is the result of primary, secondary, and tertiary oxidation/reduction reactions between the electrode and the electrolyte. These types of electrochemical capacitors are currently being developed for high pulse power applications such as in cellular telephones.

Most of the known electrochemical capacitor active materials for both cathode and anode structures are based on metallic elements such as platinum, iridium, ruthenium, or cobalt. These materials are generally quite expensive and pose a significant hurdle to the widespread commercialization of this technology. Moreover, electrochemical capacitor devices have also suffered from problems associated with the manufacture and packaging of such devices. It is the nature of electrochemical capacitors to require relatively small packages which preferably develop high pulse power spikes and require high charge/discharge rates. Prior techniques of assembling such devices typically increased the thickness of the device as well as the complexity of the manufacturing process. Increased complexity resulted in manufacturing defects which caused yield losses. Moreover, as the capacitor package became thicker due to processing, the introduction of electrode equivalence series resistance (ESR), in other words internal resistance, reduced the efficiencies of the fabricated devices as well as decreased the charge/discharge rates.

One previous approach to this problem was to fabricate the capacitor by placing the relatively thick cell or series of cells which made up the capacitor under high physical pressure. While this increased compression approach to fabrication reduced the internal resistance in the device, it created a whole new set of fabrication problems. Therefore, there remains a need to provide electrochemical capacitor devices which feature low internal resistance, thin electrode profiles and high charge/discharge rates without the inherent problems associated with high pressure containers and compression fabrication techniques for thicker electrode structures. The present invention addresses this significant problem.

SUMMARY OF THE INVENTION

Accordingly, it is one object of the present invention to provide a thin profile electrode for electrochemical capacitors having high charge/discharge rates.

It is another object of the present invention to provide an ink printing mechanism for applying a thin layer of active material to conductive substrates to form an electrode structure.

Yet another object of the present invention is to provide a unique metal oxide ink as an active material for a capacitor electrode structure.

Still another object of the present invention is to provide a modified electrode structure to enhance the operative bonding between a metal oxide ink material and a conductive substrate.

To achieve the foregoing and other objects and in accordance with the purpose of the present invention, as embodied and broadly described herein, an electrode for a capacitor is provided and includes a conductive metal foil layer and an electronically conductive intermediate layer disposed on the metal foil layer. A thin metal oxide ink coating is operatively printed on the intermediate layer and in one form includes a mixture of a carbon containing powder, a metal oxide powder, a conductive binder, a polar solvent and a dispersing agent.

In one form of the invention the intermediate layer includes a mixture of a polymer, carbon powder and fiber. In yet another form of the invention, the metal foil is selected from the group consisting of tantalum, aluminum, niobium, zirconium, gold and titanium, and the metal oxide is selected from oxides of the group consisting of ruthenium, iridium, nickel, rhodium, rhenium, cobalt, tungsten, manganese, tantalum, molybdenum, lead, titanium, platinum, palladium and osmium.

In still another form of the invention, the metal oxide ink includes a mixture of metal oxide powder, carbon-containing powder, a conductive binder, a solvent and a flocculation preventing dispersing agent.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 1 is a cross-sectional view of a prior art electrode structure;

FIG. 2 is a cross-sectional view of an electrode structure constructed in accordance with one embodiment of the present invention; and FIG. 3 is a graph illustrating the relationship between the capacitance of a capacitor having electrodes constructed in accordance with one embodiment of the present invention and the thickness of the metal oxide active layer of the electrodes therein.

DETAILED DESCRIPTION OF THE PREFERRED EMBODIMENT

The present invention is directed particularly towards thin-film metal oxide electrodes for use in electrochemical capacitors. FIG. 1 illustrates an electrode 10 having a thin-film metallic oxide active layer 12 deposited onto the surface of a conductive substrate 14. In preferred form, the metallic oxide active layer 12 is selected from oxides of the group consisting of ruthenium, iridium, nickel, rhodium, rhenium, cobalt, tungsten, manganese, tantalum, molybdenum, lead, titanium, platinum, palladium and osmium. The active layer 12 is preferably layered onto the substrate 14 utilizing printing techniques and is preferably approximately 2.0–25.0µ in thickness. The conductive substrate 14 is preferably metal foil selected from the group consisting of tantalum, aluminum, niobium, zirconium, gold and titanium, although any type of conductive substrate such as conductive rubber may be utilized with the present invention. Most preferably, the metal oxide of layer 12 is ruthenium oxide while the metal foil of substrate 14 is titanium foil.

FIG. 2 illustrates a modified embodiment of the present invention. In this form of the invention, an electronically conductive intermediate layer 16 is disposed as a transition layer between the active layer 12 and the substrate 14 to substantially increase the adhesion of the active layer 12 to the substrate 14. In this preferred embodiment, the intermediate transition layer 16 is preferably composed of a mixture of a conductive polymer, carbon powder and fiber. The intermediate layer 16 is electrically conductive, and the thickness is preferably less than about 12 µm.

While the conductive polymer 16 may be chosen from any known conductive polymer, preferred polymers include polyvinyl chloride, natural rubber and polyvinyl acetate. The carbon powder component of the intermediate layer 16 is preferably particulate carbon powder less than about 30 µm in diameter. Finally, the preferred fiber component is graphite. The intermediate transition layer 16 is preferably 80 to 90% by weight of carbon powder and fiber with the remaining being the polymer.

The active metal oxide layer 12 in either embodiment of FIGS. 1 and 2 may be modified to form yet another embodiment of the present invention. The active layer 12 may be in the form of pure metal oxide as described above or it may be in the form of a mixture of a carbon containing powder, a metal oxide powder, a conductive binder, a polar solvent and a dispersing agent. In this particular embodiment, the carbon powder component is preferably in the form of particulate carbon powder or carbon aerogel powder less than 10 µm in diameter and is mixed with the metal oxide powder as described above.

A conductive binder is then added to this mix of carbon-containing powder and metal oxide powder. Suitable conductive binders may be any type of known proton conducting binder and is preferably a polymer having carboxylic or sulfonic acid groups attached to the polymer backbone, especially where the polymer backbone is fluorinated. Particularly suitable binders are organic polymers having a fluorinated backbone and terminal sulfonic acid or carboxylic acid groups on a fluorinated chain pendant to the backbone. A preferred conducting binder is a fluorinated material arising from the copolymerization of tetrafluoroethylene and $FSO_2CF_2CF_2OC(CF_3)FCF_2OCF=CF_2$, which is supplied in an aqueous solution by DuPont under the trademark Nafion.

An appropriate solvent is then added to the mix of carbon-containing powder, metal oxide powder and conductive binder. Such appropriate solvents may include a mixture of water and polar solvent such as 1-Butanol, Dimethyl sulfoxide, N,N-dimethylformamide, ethylene glycol, and other appropriate polar solvents. The preferred ratio of carbon to metal oxide in the mixture is approximately 1:20 by weight.

A dispersing agent is then added to this mixture to prevent metal oxide flocculation to produce a well-dispersed metal oxide ink. Otherwise, without the dispersing agent, the particles in the mix tend to agglomerate, and the dispersing agent prevents this. In preferred form, the dispersing agent may include polyvinyl acetate, polyvinyl difluoride (Teflon), or polyvinyl chloride in about 0.2 weight % of the carbon-containing and metal oxide powder mixture. As a result of this metal oxide active layer mixture, thin coating of active material 12 ranging in thickness from 2.5–25.0 µm can be printed onto the conductive substrate 14 directly or indirectly using the intermediate layer 16.

EXAMPLE I

Utilizing the electrode structure described above, a 6-cell ultracapacitor was constructed having an ESR as low as 25 mohm under less than 2 lbs., which is the required pressure for keeping good contact between the leads and the cells. This example demonstrated that ultracapacitors constructed from electrodes of the above construction have very good consistence is performance. The following Table I illustrates the performance data for a 6-cell, 180 mF ultracapacitor constructed from electrodes made in accordance with the present invention.

TABLE I

| Capacitance-<br>MF at 0.01 hz | Capacitance-<br>mF at 1K | ESR-mΩ | |
|---|---|---|---|
| 208 | 47 | 26 | |
| 186 | 43 | 26 | |
| 160 | 49 | 28 | |
| 163 | 43 | 29 | |
| 159 | 47 | 28 | |
| 163 | 42 | 28 | |
| 214 | 50 | 25 | |
| 205 | 47 | 30 | |
| 181 | 48 | 27 | |
| 188 | 47 | 29 | |
| 182.8 | 46.3 | 27.6 | Average |
| 21.23 | 2.71 | 1.58 | Standard Deviation |
| 13.16 | 1.68 | 0.98 | 95% Confidence Interval |

Referring to FIG. 3, the thickness of the metal oxide active layer of the electrode constructed in accordance with the present invention was tested against the capacitance of 6-cell capacitors utilizing the electrode construction. As can be seen from the FIG. 3, the capacitance can in fact be controlled by the thickness of the metal oxide active layer printed onto the electrodes.

As can be seen from the above, the present invention provides an improved electrode structure for use in an electrochemical capacitor. The electrode of the invention includes a highly adhesive metal oxide ink which is easy to disperse onto the conductive substrate of the electrode because of its thinness and its improved adherence. Moreover, the present invention provides an improved bonding between the active metal oxide active layer and the conductive substrate by providing not only a thin adhesive ink composition but also an intermediate layer option which enhances the bonding. As a result of the above, a capacitor having electrodes constructed in accordance with the present invention provides a device having significant capacitance capability and high charge/discharge rates while providing significantly lower contact resistance and internal resistance therewithin.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. An electrode for a capacitor comprising:
   a conductive metal foil layer;
   an electronically conductive intermediate layer comprising a conductive polymer layer disposed on said metal layer; and
   a thin metal oxide ink coating operatively printed on said intermediate layer.

2. The electrode as claimed in claim 1, wherein said intermediate layer comprises a mixture of a conductive polymer, carbon powder and fiber.

3. The electrode as claimed in claim 2, wherein said conductive polymer is selected from the group consisting of polyvinyl chloride, natural rubber and polyvinyl acetate.

4. The electrode as claimed in claim 1, wherein said metal foil layer is selected from the group consisting of tantalum, aluminum, niobium, zirconium, gold and titanium.

5. The electrode as claimed in claim 4, wherein said metal foil layer comprises titanium.

6. The electrode as claimed in claim 1, wherein said metal oxide ink coating is selected from oxides of the group consisting of ruthenium, iridium, nickel, rhodium, rhenium, cobalt, tungsten, manganese, tantalum, molybdenum, lead, titanium, platinum, palladium and osmium.

7. The electrode as claimed in claim 6, wherein said metal oxide ink coating comprises ruthenium oxide.

8. The electrode as claimed in claim 6, wherein said metal oxide ink coating comprises a mixture of metal oxide powder, carbon-containing powder, a conductive binder, a solvent and a flocculation preventing dispersing agent.

9. In an electrode for use in a capacitor, said electrode having a conductive base layer and a metal oxide layer operatively disposed thereon, the improvement wherein said metal oxide layer comprises a mixture of a carbon containing powder, a metal oxide powder, a conductive binder, a polar solvent and a dispersing agent.

10. The improvement as claimed in claim 9, wherein said carbon-containing powder is selected from the group consisting of carbon powder and carbon aerogel powder.

11. The improvement as claimed in claim 9, wherein said metal oxide powder is selected from oxides of the group consisting of ruthenium, iridium, nickel, rhodium, rhenium, cobalt, tungsten, manganese, tantalum, molybdenum, lead, titanium, platinum, palladium and osmium.

12. The improvement as claimed in claim 11, wherein said metal oxide powder comprises ruthenium oxide powder, wherein said conductive binder comprises a fluorinated material arising from the copolymerization of $FSO_2CF_2CF_2OC(CF_3)FCF_2OCF=CF_2$ and tetrafluoroethylene, and wherein said solvent is water and a polar solvent.

13. The improvement as claimed in claim 9, wherein said dispersing agent is selected from the group consisting of polyvinyl acetate, polyvinyl chloride and polyvinyl difluoride.

14. The improvement as claimed in claim 9, wherein the ratio of said carbon-containing powder to metal oxide powder in said mixture is about 1:20 by weight.

15. A capacitor having a pair of spaced electrodes, at least one of said electrodes comprising:
   a conductive metal foil layer;
   an electronically conductive intermediate layer disposed on said metal foil layer; and
   a thin metal oxide ink coating printed on said intermediate layer, said ink coating being in the form of a mixture of a carbon containing powder, a metal oxide powder, a conductive binder, a polar solvent and a dispersing agent.

16. The capacitor as claimed in claim 15, wherein said intermediate layer comprises a mixture of a conductive polymer, carbon powder and fiber.

17. The capacitor as claimed in claim 16, wherein said polymer is selected from the group consisting of polyvinyl chloride, natural rubber and polyvinyl acetate.

18. The capacitor as claimed in claim 15, wherein said metal oxide powder is selected from oxides of the group consisting of ruthenium, iridium, nickel, rhodium, rhenium, cobalt, tungsten, manganese, tantalum, molybdenum, lead, titanium, platinum, palladium and osmium, and wherein said carbon-containing powder is selected from the group consisting of carbon powder and carbon aerogel powder.

19. The capacitor as claimed in claim 18, wherein said metal foil layer comprises titanium, wherein said intermediate layer comprises a mixture of a polymer, carbon powder and fiber, and wherein said metal oxide ink coating comprises a mixture of carbon powder, ruthenium oxide, a fluorinated material arising from the copolymerization of tetrafluoroethylene and $FSO_2CF_2CF_2OC(CF_3)FCF_2OCF=CF_2$, water with a polar solvent, and a dispersing agent selected from the group consisting of polyvinyl acetate, polyvinyl chloride and polyvinyl difluoride powder.

* * * * *